United States Patent Office 2,707,923
Patented May 10, 1955

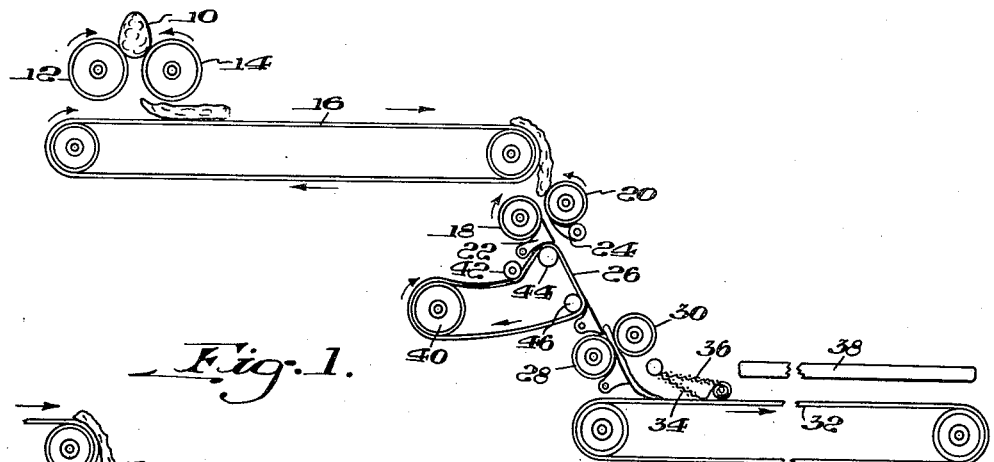
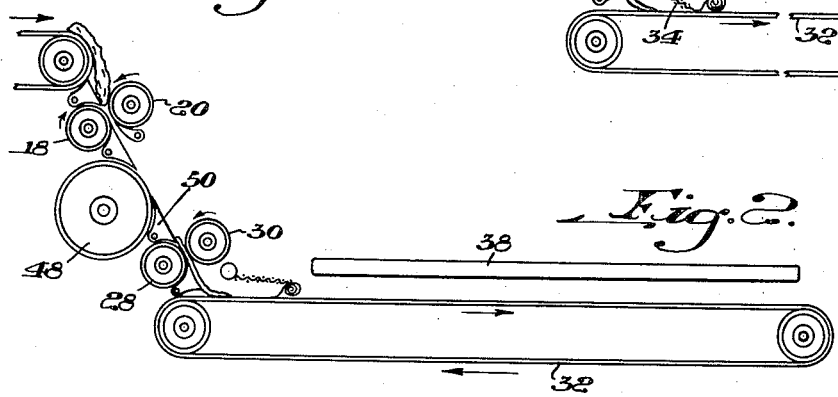
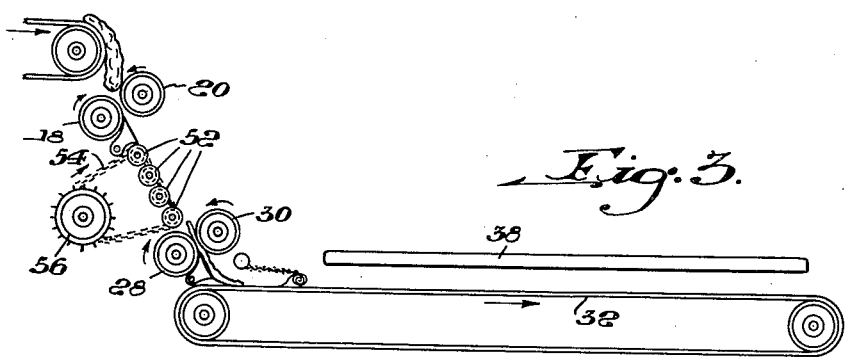
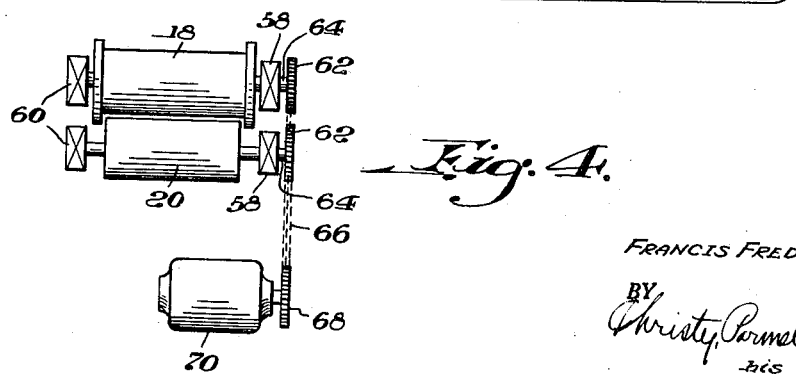
INVENTOR.
FRANCIS FREDERICK HANSEN
his ATTORNEYS.

2,707,923

TRANSFER MECHANISM

Francis Frederick Hansen, Pittsburgh, Pa.

Application April 7, 1952, Serial No. 280,892

5 Claims. (Cl. 107—12)

This invention relates to a dough transfer mechanism, more particularly, the invention relates to a mechanism for transferring a thin sheet of dough from one set of sheeting rolls to another set of sheeting rolls of a dough moulding machine.

In a commonly used dough moulding machine, a weighed lump of yeast dough is passed through a first set of sheeting rolls and then transferred by gravity across a plate to a second set of sheeting rolls to be kneaded, extruded and sheeted into a thin strip. The dough passing through the first set of sheeting rolls is quite thin and fragile so that it is supported by a plate during its passage by gravity to the second set of sheeting rolls. The transfer plate is preferably set in at an acute angle to the vertical to cause the sheet of dough to rest on the plate as it slides from one set of rolls to the other.

Extensive use of the above-described machine has shown that portions of the dough strip often stick to the plate or the dough adheres to the plate and builds up thereon so that the strip does not move smoothly across the plate. In moving across the plate, the sheets often stick and move intermittently or irregularly so that the sheet will become wrinkled or gathered or distorted which definitely interferes with the proper sheeting of the dough in the second set of sheeting rolls. As a result the dough rolls or loaves made from the sheeted dough are not uniform in texture or in length.

The primary object of the present invention is to provide a transfer mechanism between two sets of sheeting rolls by which a thin sheet of dough will be carried smoothly and uniformly from one set of rolls to the other.

Another object of the invention is to provide a transfer mechanism for uniformly carrying a thin strip of dough from one set of sheeting rolls to another set of sheeting rolls and positively feeding the strip to the second set of rolls at a rate of movement in which the strip moves when being sheeted in the first set of rolls.

With these and other objects in view, the invention consists in the dough transfer mechanism for dough moulding machines as hereinafter illustrated, described and defined independent claims.

The various features of the invention are illustrated in the accompanying drawings in which:

Fig. 1 is a diagrammatic illustration of sheeting rolls of a dough moulding machine showing a strip dough transfer mechanism embodying the preferred form of the invention;

Fig. 2 is a diagrammatic illustration of a modified form of a strip dough transfer mechanism in a dough moulding machine;

Fig. 3 is another form of sheet dough transfer mechanism for use in a dough moulding machine; and Fig. 4 is a diagrammatic plan view of a motor drive for sheeting rolls of a dough moulding machine.

The transfer mechanism which forms the main feature of the present invention is used in a dough moulding machine between the first and second sets of sheeting rolls. Referring to Fig. 1 a weighed lump of dough 10 is passed between presheeting rolls 12 and 14 to be pressed and flattened and deposited on a belt 16. The belt 16 carries the flattened dough to the first set of sheeting rolls 18 and 20. As the dough passes between the sheeting rolls, it is rolled into a comparatively thin strip and is removed from the roll by means of doctors 22 and 24 to be deposited on a transfer belt 26. The strip is supported upon the belt and carried by the belt to the second set of sheeting rolls 28 and 30. As the dough passes between the rolls 28 and 30, it is further kneaded, extruded and compressed so that it issues as a thin sheet on a belt 32. The belt 32 carries the dough under curling screens 34 and 36 to roll the dough into a roll and thereafter the dough roll passes under a pressure board 38 from which it is delivered into the panning equipment.

The transfer belt 26 shown in Fig. 1 consists of a broad fabric belt having the same width as the sheeting rolls 18 and 20 and has its delivery run positioned on an angle to the vertical of 28–30°. With this angle the strip of dough will rest upon the straight delivery run of the belt and will not have a tendency to slide on the belt as the end of the sheeted dough passes out of the grip of the sheeting rolls 18 and 20. The belt is positively driven by driving a pulley 40 over which the belt passes. The belt passes from the pulley 40 to a positioning pulley 42 and around positioning pulleys 44 and 46. The pulleys 44 and 46 are comparatively small in order that these pulleys may be positioned under the sheeting rolls to bring the belt close to the position in which the sheet of dough is discharged from the rolls 18 and 20 and to deliver it into the bite of the rolls 28 and 30. The guide pulleys control the arrangement of the belt for acting as a transfer mechanism to carry the sheeted dough in a uniform flat condition in transferring the dough from one set of sheeting rolls to the other.

With the construction illustrated in Fig. 1 the dough lays as a flat strip upon the transfer run of the belt 26 and is delivered smoothly to the following set of sheeting rolls. The belt is preferably driven at a rate of speed which will give the dough sheet a rate of linear movement equal to the rate of movement of the sheet of dough between the rolls 18 and 20 so that there will be no wrinkling or puckering of the strip of dough as it passes from the belt into the rolls 28 and 30.

In Fig. 2 is illustrated a modified form of transfer mechanism which consists of a large pulley 48 which is mounted between the first and second sets of sheeting rolls so that the face of the pulley will engage the sheet of dough being delivered from the rolls 18 and 20 at a point which is substantially at an angle of 28–30° from the vertical. The roll is preferably driven to positively act to feed the sheet of dough passing thereover down to the bite of the second set of sheeting rolls 28 and 30. The rate of lineal speed of the surface of the roll 48 is preferably equal to the rate of lineal movement of the strip of dough between the rolls 18 and 20. A doctor 50 is mounted below the roll 48 to guide the strip of dough off of the roll into the bite of the rolls 28 and 30. Preferably doctors are also used in conjunction with the sheeting rolls to remove the strip of dough from the rolls to be transferred from one set of rolls to the next set of rolls.

In Fig. 3 is illustrated another form of transfer mechanism for carrying sheeted dough between the first and second sets of sheeting rolls. This transfer mechanism consists of a series of small rolls 52 which are mounted with the axes of the rolls at an angle of substantially 28–30° to the vertical, with the faces of the rolls in position to receive the strip of dough as it is discharged from the first set of sheeting rolls 18 and 20. Each of the rolls 52 is provided with a sprocket on which is mounted a chain 54 that passes over positively driven sprocket wheel 56. By driving the sprocket wheel 56, the rolls 52 may be positively rotated to give a transfer movement to a sheet of dough passing across their face. Preferably the rate of lineal movement imparted to the dough sheet by the rolls 52 is equal to the rate of lineal movement of the dough strip passing between the sheeting rolls 18 and 20.

In Fig. 4 is diagrammatically illustrated a motor drive for a pair of sheeting rolls which may be the sheeting rolls 18 and 20. Each of these rolls are journaled in bearings 58 and 60 and have sprocket wheels 62 mounted on axles 64 for the rolls. The sprocket chain 66 runs from the sprocket wheels 62 to a sprocket 68 driven by a motor 70. The arrangement of the sprockets and chain is such that the rolls will be rotated in opposite directions in order to positively feed the dough loaf between them. A single motor may be used for operating all of the rolls of the present machine by the appropriate use of sprockets and sprocket chains. The same motor may also be used for operating the belts 16 and 32.

If desired, the sheeting rolls may have different diameters so as to be operated at different lineal rates of speed for sheeting such as illustrated and described in my application Serial No. 261,288, filed December 12, 1951.

In each of the forms of transfer mechanism illustrated in Figs. 1, 2 and 3 it is desirable to have the movable transfer mechanism extend as close as possible between the sheeting rolls so that the fragile and bendable strip of dough will not be wrinkled as it passes from the discharged bite of one set of rolls into the bite of the succeeding set of rolls. Doctors preferably used with each of the sheeting rolls to insure that the dough sheet as formed will be removed from the sheeting rolls to be delivered to the transfer mechanism.

The preferred form of the invention having thus been described, what is claimed as new is:

1. In a dough molding machine to prepare short pieces of dough for bread loaves, a first set of sheeting rolls, means to rotate the rolls to produce a thin elongated strip, a second set of sheeting rolls positioned below the first set of rolls arranged to receive a dough strip from the first set of rolls, means to rotate the second set of rolls to further elongate the strip formed in the first set of rolls, said second set of rolls being positioned below and in advance of the first set of rolls so that a downward straight line of travel of a dough strip from the discharge of the first set of rolls to the bight of the second set of rolls is at an angle between 28° and 30° to the vertical and a mechanism located between said two sets of rolls for transferring a strip of dough from the first to the second set of rolls comprising a movable member having its surface arranged in said line of travel to receive the dough strip as it issues from the first set of rolls and to support the sheet in a smooth unwrinkled condition, and means for moving the member at the same lineal rate of speed as said dough strip and in the direction of the second set of rolls so as to positively advance the strip to the second set of rolls.

2. The dough moulding machine having sheeting and transfer mechanism as defined in claim 1 in which the movable member is arranged to support the dough strip at an angle of 28° to 30° to the vertical in order to support a strip of thin dough thereon without sliding on the member.

3. The dough moulding machine having sheeting and transfer mechanism as defined in claim 1 in which the transfer member is a positively driven belt.

4. The dough moulding machine having sheeting and transfer mechanism as defined in claim 1 in which the transfer member is a roll which has a diameter that bridges the major portion of the distance between the first and second sets of rolls and its face is positioned in the line of bight of the two sets of rolls.

5. The dough moulding machine for sheeting and transfer mechanism as defined in claim 1 in which the transfer member is a positively driven set of small rolls which bridge the major portion of the distance between the first and second sets of rolls.

References Cited in the file of this patent

UNITED STATES PATENTS

| | | |
|---|---|---|
| 1,911,786 | Barmakian | May 30, 1933 |
| 1,975,326 | Loose et al. | Oct. 2, 1934 |
| 2,357,085 | Cohen et al. | Aug. 29, 1944 |
| 2,431,074 | Palmer | Nov. 18, 1947 |
| 2,479,864 | Rhodes | Aug. 23, 1949 |